(12) United States Patent
Krzanowski et al.

(10) Patent No.: US 7,573,819 B2
(45) Date of Patent: Aug. 11, 2009

(54) METHODS AND APPARATUS FOR CONTROLLING BANDWIDTH AND SERVICE IN A COMMUNICATIONS SYSTEM

(75) Inventors: Roman M. Krzanowski, White Plains, NY (US); Charles Thomas Wilkes, Londonderry, NH (US); Stevan Harvey Leiden, Norwood, MA (US); William Ed Garrett, Jr., Framingham, MA (US); Jean M. McManus, Arlington, VA (US)

(73) Assignee: Verizon Services Corp., Arlington, VA (US)

( * ) Notice: Subject to any disclaimer, the term of this patent is extended or adjusted under 35 U.S.C. 154(b) by 841 days.

(21) Appl. No.: 10/815,549

(22) Filed: Apr. 1, 2004

(65) Prior Publication Data
US 2005/0226251 A1 Oct. 13, 2005

(51) Int. Cl.
*G01R 31/08* (2006.01)
*H04L 12/28* (2006.01)
(52) U.S. Cl. ............... 370/235; 370/395.2; 370/395.21
(58) Field of Classification Search ................. 370/229, 370/230, 232, 233, 235, 236, 236.1, 395.21, 370/352
See application file for complete search history.

(56) References Cited

U.S. PATENT DOCUMENTS

| | | | |
|---|---|---|---|
| 5,898,673 A * | 4/1999 | Riggan et al. ............... 370/237 |
| 6,938,080 B1 * | 8/2005 | Kahveci et al. ............. 709/223 |
| 6,975,594 B1 * | 12/2005 | Byers .......................... 370/238 |
| 7,145,898 B1 * | 12/2006 | Elliott ......................... 370/352 |
| 7,412,538 B1 * | 8/2008 | Eytchison et al. ........... 709/245 |
| 2003/0086514 A1 * | 5/2003 | Ginis et al. .................. 375/346 |
| 2003/0152028 A1 * | 8/2003 | Raisanen et al. ............ 370/235 |
| 2004/0184483 A1 * | 9/2004 | Okamura et al. ............ 370/477 |
| 2004/0228356 A1 * | 11/2004 | Adamczyk et al. .......... 370/401 |
| 2005/0021804 A1 * | 1/2005 | Hameleers et al. .......... 709/231 |
| 2005/0144284 A1 * | 6/2005 | Ludwig et al. .............. 709/226 |
| 2005/0226249 A1 * | 10/2005 | Moore ................... 370/395.21 |

* cited by examiner

*Primary Examiner*—Kevin C Harper
*Assistant Examiner*—Christine Duong

(57) ABSTRACT

Methods and apparatus for performing admission control and bandwidth allocation from a centralized network location in a communications system which supports various IP based services are described. Admission control is performed based on user interaction with a Web interface hosted by a centralized control. Users may subscribe/unsubscribe to premium (e.g., high bandwidth) services. Admission control to the premium services is controlled by the centralized control. The control interfaces with a gateway (edge) router which implements service decisions. The centralized control maintains a database of the users, links in the network, network elements, and estimates of allocated/free bandwidth on the links. In some embodiments, traffic, not under centralized control, e.g., from business switches and/or legacy gateway routers may be injected onto the network links. Load estimation methods are used to account for bandwidth consumed on the links by this injected traffic.

10 Claims, 7 Drawing Sheets

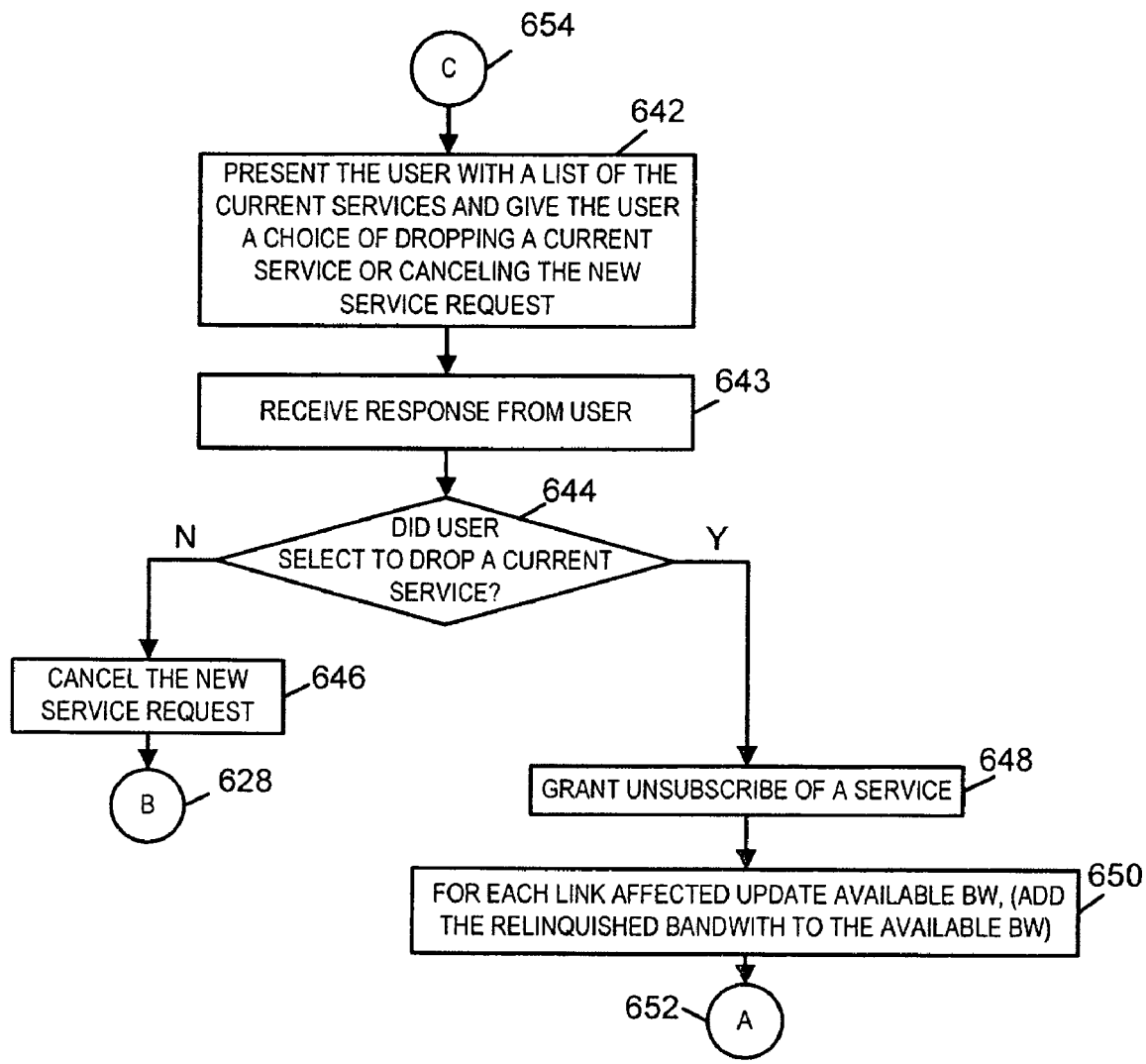

METHODS AND APPARATUS FOR CONTROLLING BANDWIDTH AND SERVICE IN A COMMUNICATIONS SYSTEM

FIELD OF THE INVENTION

The present invention relates generally to the field of communications systems and, more particularly, to the field of user access, e.g., admission control procedures, and bandwidth allocation suitable for use in, e.g., system which provide DSL (digital subscriber line) services.

BACKGROUND OF THE INVENTION

Currently, DSL services are normally offered as best effort services without any guarantees, e.g., with regard to end to end data rates (bandwidth) that will be provided. Such best effort services cannot support products that require certain specific guaranteed levels of bandwidth and/or quality of service (QoS) which may be expressed in terms of latency, jitter and/or packet loss. Products which require bandwidth and/or QoS guarantees include, for example VoIP, Video RT, or gaming. Products that require particular levels of guaranteed bandwidth and/or QoS guarantees are usually more expensive products then best effort products, e.g., basic Internet Access. Accordingly, DSL providers may increase their profits or increase the attractiveness of its offer in cases where they can provide a customer with various service guarantees.

Existing DSL architectures may control access and bandwidth based on ATM service classes but such implementations tend to be very expensive to implement and generally cannot be used ad-hoc or on request. In addition they are generally fixed type implementations that do not allow for flexible bandwidth allocation policies based on the particular user making the request in combination with the type of service being requested.

Providing bandwidth guarantees in a DSL network is complicated, particularly in the case of an existing system, by the difficulty to predict and/or control traffic on a network link. In existing DSL networks, portions of the networks often include traffic from outside sources, not under the control of the local service provider. These outside sources may inject traffic onto the local network consuming bandwidth. Given that the local service provider normally can not directly control such loads or know the actual load from such sources with certainty at any particular time, there is a need for taking such loads into consideration when deciding on whether to admit or deny requests for services.

In view of the above discussion, it should be appreciated that there is a need for load estimation methods for the links in DSL networks which could be used to efficiently estimate link utilization and control link utilization so that the capacity of each link in a network is utilized in an efficient manner.

Known approaches to varying user data rates include applying distributed load estimation methods. In such known methods, the admission control is distributed throughout the system, and decisions for a positive admission of a user to a higher level of service (e.g., more bandwidth) are evaluated by many elements (e.g., multiple routers, switches, DSLAMs, etc.) along the communications flow path. Each element performing an evaluation needs to give a positive decision for admission and/or more bandwidth allocation to a user. One such known method used to implement distributed load estimation involves RSVP (Resource Reservation Protocol). In the case of RSVP, the node to which each link along a communications path corresponds makes a separate determination as to whether the requested session will exceed link capacity. If any one node along a path determines it does not have the capacity to satisfy a session request, the request will be denied. Current implements of RSVP in DSL networks have been problematic and difficult to implement. Accordingly, there is a need for an alternative method to take into consideration link capacity and make admission control/service decisions based on available capacity.

In light of the above discussion, there is a need for improved methods of admission control and bandwidth allocation in communications networks, e.g., networks which provide different types of services over DSL and other types of lines to subscribers.

Methods of admission control and bandwidth allocation that utilize a centralized control method, as opposed to a distributed control method, could be beneficial. Methods that allow for users to request and relinquish various levels of premium (e.g., high bandwidth) services dynamically would be particularly desirable. It would be beneficial if at least some of the new methods allowed a user to dynamically terminate sessions/services to free up bandwidth need to satisfy a request by the user.

SUMMARY OF THE INVENTION

Figure 1:
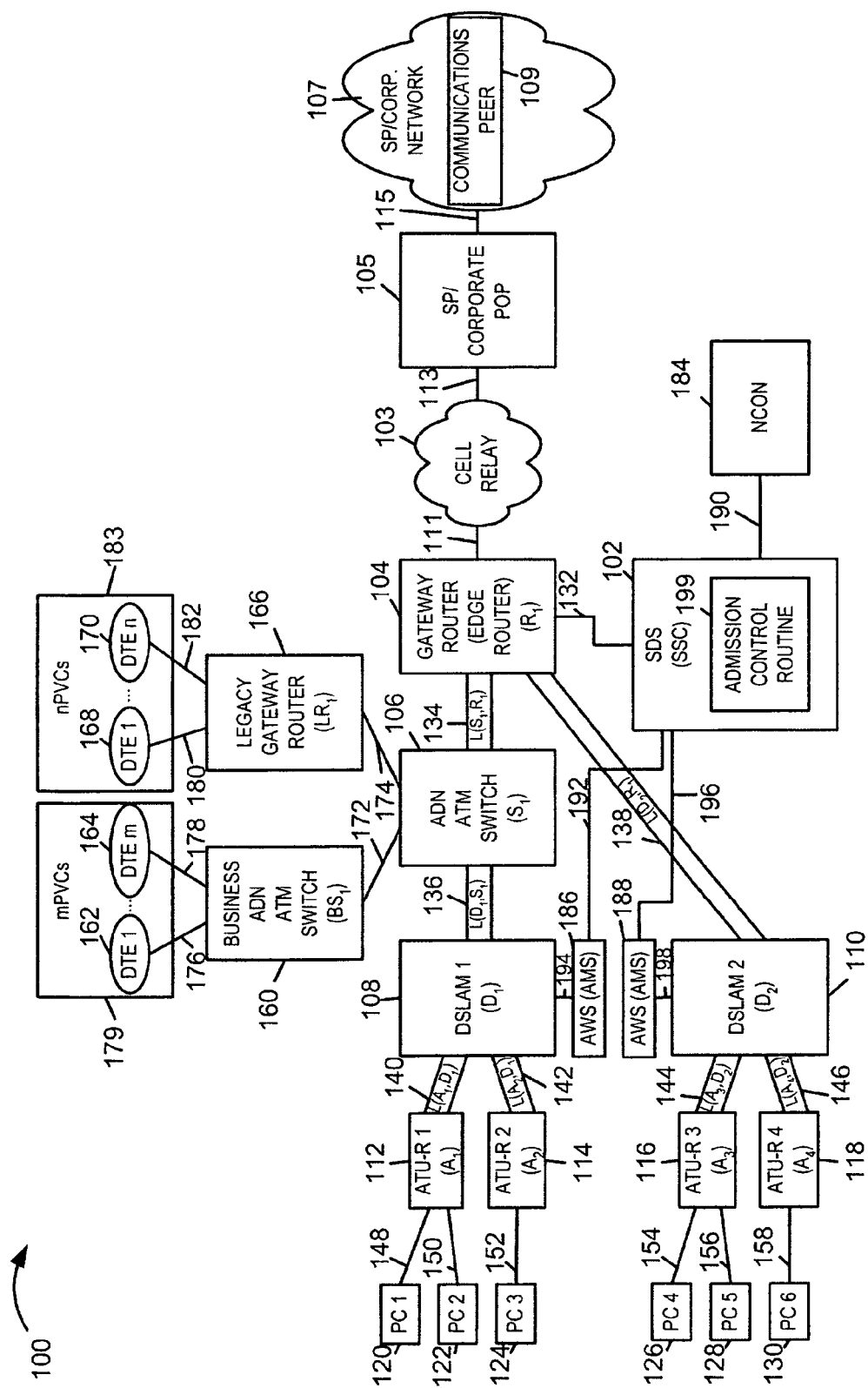
FIG. 1 illustrates an exemplary DSL communications system implemented in accordance with the present invention.

The present invention is directed to methods and apparatus for supporting flexible and/or reliable service request control decisions, e.g., flow admission requests decisions, in a communications system, e.g., a communications system which supports IP based services through the use of one or more DSL connections. Various features of the invention are directed to improved methods for tracking and estimating the bandwidth on each of the links in the local DSL network thereby supporting better and/or more efficient utilization of the available bandwidth on each of the links when such information is used in combination with the centralized service control features of the invention. Such link bandwidth tracking methods include methods used to account for injected traffic not under the control of the local network.

Service/admission control decisions correspond to bandwidth allocation decisions since bandwidth is utilized by granted requests for services and/or admitted flows. Admitted flows may correspond to IP packet and/or ATM cell flows corresponding to a requested service or communications session.

Bandwidth monitoring and service request/admission control decisions are made within a network with regard to one or more communications links, e.g., router connections, from a centralized location. Flows on different links are monitored. Link traffic information is communicated to a centralized location, a control node in the form of a service control system sometimes called referred to as a Service Deployment System (SDS. The centralized location keeps track of different service requests, granted requests, and the amount of bandwidth required by the granted requests. Estimates of best effort traffic, e.g., Internet traffic, over various links are generated and maintained. For premium services with a guaranteed level of bandwidth, that is known to the SDS, the guaranteed bandwidth is taken into consideration when calculating a traffic load on links over which traffic corresponding to a requested service request/admission control request will flow.

Estimates of the effect of traffic over which the SDS does not have control are made and factored into estimates of available bandwidth on the links in the system.

Service requests, which may be in the form of admission control requests, are communicated to the SDS from various nodes. The SDS takes into consideration the type of service being requested and the availability of bandwidth required to service the requests on links in the network. Before granting a request, the SDS determines whether there is available bandwidth on the links which will be affected by the request based on the known link load information, estimated link load information and, in some cases, one or more scaling factors. In the case where there is a single bottleneck node, e.g., a node which represents the most constrained part of the communications path over which packets will flow, the decision to grant or deny a service request may be made based on whether or not the necessary bandwidth is determined to be available on the bottleneck node.

In accordance with one feature of the present invention, the SDS may respond to a service request when there is insufficient capacity to grant the request on a link by adjusting the load on the link, e.g., by reducing the amount of best effort traffic allowed to pass over the link. Such adjustments may be made, e.g., by a router coupled to the link, based on control information provided by the SDS. In accordance with another feature of the present invention, when the SDS determines that there are insufficient resources on a link to service a request, the SDS will check to determine if the user making the request has one or more active services which are using resources on the congested link. Assuming that the requesting user is utilizing sufficient resources on the congested link that, if released, would make the requested service possible, the user is presented with the chance to terminate the ongoing services and have the resources reallocated to servicing the user's current request. If the user indicates a willingness to terminate the sessions consuming the resources on the congested link the SDS terminates the services and the grants the user's request for the new service.

The methods and apparatus are particularly well suited for a hierarchical service system where higher priority, e.g., premium services, are given priority over lower priority, e.g., best effort, services. To avoid best effort traffic being denied completely, at least some bandwidth may be reserved on a link for best effort traffic even in cases where traffic having a higher priority may seek to use a link.

While the methods and apparatus of the present invention are described in the context of system where DSL links are used to connect at least some end user systems to network nodes, the methods and apparatus of the present invention with centralized link load estimation and admission control are well suited for a wide variety of networks where different types of service with differing quality levels may be required and/or where there is a need to support a hierarchy of services with limited communications resources.

While admission control may depend on the availably of sufficient bandwidth on one or each link to be used to provide a service, by centralizing the service/admission control process, significant savings in overhead may be achieved. Noticeable improvements may be achieved as compared to RSVP or other approaches where each node involved in providing a service is responsible for making a decision as to whether or not a service request should be granted and the end decision depends on the combination of decisions by several individual nodes.

Numerous additional features and benefits of the methods and apparatus of the present invention are discussed below in the detailed description which follows.

DETAILED DESCRIPTION

The present invention is directed to methods and apparatus for supporting flexible and/or reliable service request/admission control decisions in a communications system, e.g., a communications system which supports IP based services through the use of one or more DSL connections. The service/admission control decisions correspond to bandwidth allocation decisions since bandwidth is utilized by granted requests for services and/or admission of flows, e.g., as part of establishing a communications session or providing a service. A DSL communications system, implemented in accordance with the present invention, may use a Vertical Services Domain (VSD) architecture or other hierarchical architecture service structure.

FIG. 1 illustrates an exemplary DSL communications system 100 using apparatus implementing the methods of the present invention. Communications system 100 includes a Service Deployment System (SDS) 102, a gateway router (GWR) ($R_1$) 104, an Advanced Digital Network Asynchronous Transfer Mode (ADN ATM) Switch ($S_1$) 106, a plurality of Digital Subscriber Line Access Multiplexers (DSLAMs): (DSLAM 1 ($D_1$) 108, DSLAM 2 ($D_2$) 110), a plurality of Asymmetric Digital Subscriber Line (ADSL) Termination Units—Remote (ATU-Rs): (ATU-R1 ($A_1$) 112, ATU-R2 ($A_2$) 114, ATU-R3 ($A_3$) 116, ATU-R4 ($A_4$) 118, and a plurality user devices, e.g., personal computers, (PC1 120, PC2 122, PC3 124, PC 4 126, PC 5 128, PC 6 130). The SDS 102 is coupled to gateway router ($R_1$) 104 via link 132. Gateway router ($R_1$) 104 is coupled to ADN ATM switch $S_1$ 106 via link $L(S_1,R_1)$ 134, and ADN ATM switch ($S_1$) 106 is coupled to DSLAM ($D_1$) 108 via link $L(D_1,S_1)$ 136; gateway router ($R_1$) 104 is also coupled to DSLAM ($D_2$) 110 via link $L(D_2,R_1)$ 138. DSLAM ($D_1$) 108 is coupled to ATU-R ($A_1$) 112 and ATU-R ($A_2$) 114 via links $L(A_1,D_1)$ 140, $L(A_2,D_1)$ 142, respectively. DSLAM ($D_2$) 110 is coupled to ATU-R ($A_3$) 116 and ATU-R ($A_4$) 118 via links $L(A_3,D_2)$ 144, $L(A_4,D_2)$ 146, respectively. ATU-R ($A_1$) 112 is coupled to PC 1 120 and PC 2 122 via links, 148, 150, respectively; ATU-R ($A_2$) 114 is coupled to PC 3 124 via link 152. ATU-R ($A_3$) 116 is coupled to PC 4 126 and PC 5 128 via links 154, 156, respectively; ATU-R ($A_4$) 118 is coupled to PC 6 130 via link 158 coupled together as shown in FIG. 1.

Service Deployment System (SDS) 102 (sometimes alternately referred to as a Service Selection Center (SSC)) is the central point in the system 100 for processing user (e.g, ATU-R $A_1$ 112) requests for change in service levels (e.g., add a premium service) and making admission control decisions via its admission control routine 199. SDS 102 tracks how much bandwidth is available on the links between the GWR $R_1$ 104 and ATU-Rs 112, 114, 116, 118, and makes admission control decisions (denies/grants service, e.g., flow admission or communication session, requests). Gateway Router ($R_1$) 104 (sometimes alternately referred to as an a provider edge router or a service router) is coupled to the SDS 102 and is responsive to service/admission control decisions made by the SDS 102 to admit deny requests for service and/or restrict bandwidth allocated to particular type of traffic, user or service.

ADN ATM switch ($S_1$) 106 located at an intermediate point between GWR ($R_1$) 104 and DSLAM ($D_1$) 108 couples non-VSD elements and traffic (outside the control of admission control routine 199) onto links carrying traffic for VSD users (e.g., link L ($D_1,S_1$) 136). These non-VSD elements may be part of existing legacy systems; and the bandwidth consumed by these non-VSD elements on the links managed by the SDS 102 is estimated in accordance with the methods of the invention.

DSLAMs (e.g. $D_1$ 108) multiplex inputs from a plurality of VSD users (e.g., ATU-Rs $A_1$ 112 and $A_2$ 114) onto a link (e.g., L($D_1,S_1$) 136). DSLAMs control and set data line rates (control bandwidth) on links between the ATU-Rs and the DSLAMs (e.g., L($A_1,D_1$) 140). ATU-Rs (e.g., $A_1$ 112) are users in the VSD architecture and are under the control of the SDS 102. Each ATU-R (e.g. $A_1$ 112) is a modem, which operates as a VSD user. Each VSD user may request via a Web portal, hosted by the SDS 102, changes in service levels. Each VSD user (ATU-R) has a basic level of service provided plus the capability to request and relinquish premium levels of service. Each VSD user is coupled to a plurality of user devices (e.g., PC 1 120, PC 2 122). Such user devices, may include other devices other than the exemplary PCs illustrated, e.g., telephones, video conference equipment, data link devices, television display or recording devices, music devices, etc.

Communications system 100 also includes a Business ADN ATM Switch ($BS_1$) 160 coupled to a plurality of Data Terminal Equipments (DTEs) (DTE 1 162, DTE m 164) represented by m PVCs 179, and a Legacy Gateway Router ($LR_1$) 166 coupled to a plurality of DTEs (DTE 1 168, DTE n 170) represented by n PVCs 183. Business ADN ATM Switch ($BS_1$) 160 and Legacy Gateway Router ($LR_1$) 166 are coupled to the ADN ATM Switch ($S_1$) 106 via links 172, 174, respectively. Business ADN ATM Switch ($BS_1$) 160 is coupled to DTE 1 162, DTE m 164 via links 176, 178, respectively. Legacy Gateway Router ($LR_1$) 166 is coupled to DTE 1 168, DTE n 170 via links 180, 182, respectively. DTE's may include non VSD users (e.g., a communication peer of $A_1$ 112) which may direct traffic consuming bandwidth over link L($D_1,S_1$) 136 which does not transverse GWR ($R_1$) 104.

System 100 also includes a Network Configuration Manager (NCON) 184 and a plurality of workstations which may be implemented, e.g., as Alcatel ADSL Work Stations (Access Management Systems) AWSs (AMSs) 186, 188. NCON 184 is coupled to SDS 102 via link 190. AWS 186 is coupled to SDS 102 via link 192 and coupled to DSLAM 1 ($D_1$) 108 via link 194; AWS 188 is coupled to SDS 102 via link 196 and coupled to DSLAM 2 ($D_2$) via link 198.

NCON 184 is a provisioning system used to maintain and provision the DSL system. The NCON 184 may include information on the equipment in the system, e.g. $R_1$ 104, $S_1$ 106, $D_1$ 108, $D_2$ 110, $BS_1$ 160, $LR_1$ 166, information of links, information on users, and path details including information on the ATM cloud. In accordance with the invention, NCON 184 provisions the SDS 102's database with information (e.g., user IDs, user phone #, user base rate, use ports on routers and switches) to be used by admission control routine 199. In accordance with the invention, the SDS 102 periodically queries the AWSs 186, 188 to obtain information such as the users' sync rate. This information is indicative of the maximum data rate that can be communicated between the user and the DSLAM in the upstream and downstream directions. The AWSs 186, 188 interface with the DSLAMs $D_1$ 108, $D_2$ 110, respectively to retrieve the information from the DSLAMs and convey the information back to the SDS 102 for use in admission control decisions.

System 100 further includes a cell relay 103, a Service Provider/Corporate Point of Presence (SP/Corporate POP) 105, and an SP/Corporate Network 107 including a communications peer 109. The Gateway Router ($R_1$) 104 is coupled to cell relay 103 via link 111; cell relay 103 is coupled to SP/Corporate POP 105 via link 113; SP/Corporate POP 105 is coupled to SP corporate network 107 via link 115.

Cell relay 103 may include a core and/or transport network. Cell relay 103 relays information, e.g., ATM packets, from/to Gateway Router ($R_1$) 104. SP/Corporate POP 105 may be an interchange carrier's local central office. SP/Corporate network 107 may be a network controlled by a service provider other than the service provider operating the SDS 102, NCON 184, and Gateway Edge Router 104. The interconnectivity between Gateway Router $R_1$ 104 and communications peer 109 may enable connectivity between a VSD user (e.g., user $A_1$ 112) and a communications peer 109. Communications peer 109 may communicate information (e.g., high bandwidth data such as compressed data files of movies on demand) to a VSD user (e.g., $A_1$ 112) which has requested and been granted a premium level of service by the SDS 102. The VSD user request is normally generated in response to a request initiated by an actual human user operating a PC or other device coupled to the ATU-R.

Admission control in the VSD architecture of system 100 (e.g., for user $A_1$ 112) is performed based on user interaction with a Web portal hosted by the Service Deployment System (SDS) 102. User requests for premium services (such as Coolcast or Intertainer streams) with QoS are made via this portal; in some cases, a customer can also go directly to a content provider's Web site to request content (bypassing the portal), but then the user will receive only best-effort service. The SDS 102 keeps track of the total bandwidth consumed by premium services with bandwidth guarantees in the following segments of the access network of system 100:

1. The link between the user's DSL modem (ATU-R) and the DSLAM, (e.g., link L($A_1, D_1$) 140 between user $A_1$ 112 and $D_1$ 108); and
2. One or more links between the DSLAM and the Gateway Router, depending on the architectural variant of the link:
    a. In a "distributed" variant, there is a direct link (typically Digital Service, Level 3 (DS-3), although sometimes Optical Carrier-3 (OC-3)) between the DSLAM and the Gateway Router, (e.g., link L($D_2,R_1$) 138 between $D_2$ 110 and $R_1$ 104); or
    b. In a "hubbed" variant, a DSLAM is coupled to the Gateway router by an intermediate device, e.g., an ATM switch which operates as a traffic hub. Consider for example ATM switch 106 which operates as a hub. In such a case there are multiple links, e.g., the link (typically DS-3) between the DSLAM and the optional ATM switch, (e.g., link L($D_1,S_1$) 136 between $D_1$ 108 and $S_1$ 106), and the link (typically OC-3) between the optional ATM switch and the Gateway Router, (e.g., link L($S_1,R_1$) 134 between $S_1$ 106 and $R_1$ 104).

The calculation of total bandwidth consumed in segments (2a) or (2b) above involves a summation over the VSD users hosted on those segments. The information needed to perform this calculation is maintained by the SDS 102 in a database, e.g., a Lightweight Directory Access Protocol (LDAP) database.

In order for a user request for a premium service to be granted, sufficient free bandwidth to support that service request should be available in each of the network segments (links) between the user (e.g. $A_1$ 112) and the Gateway Router (e.g. $R_1$ 104), otherwise the request is denied. If the request is denied, the user may be given the option of deactivating one of the user's currently-subscribed premium services in order to make that bandwidth available to satisfy the new service request.

It is possible that there will be bandwidth consumed on the link between the DSLAM and the ATM switch (e.g. link $L(D_1,S_1)$ 136) in the hubbed variant that is not under the control of the admission control routine 199 and thus is not accounted for or controlled by the IP QoS policies at the Gateway Router ($R_1$) 104. For example, as illustrated in FIG. 1, downstream traffic due to non-VSD services may be inserted at the ATM switch ($S_1$) 106 on link $L(D_1,S_1)$ 136 by a "legacy" Gateway Router ($LR_1$) 166 (supporting neither VSD nor IP QoS), or by an ATM switch supporting the "Business ADN" service ($BS_1$) 160 (i.e., business-grade DSL). In this situation, the following problems arise:

1. The admission control routine 199 of SDS 102 is not aware of the bandwidth being consumed by the non-VSD services, and thus the bandwidth is not directly accounted for in the admission control calculations.
2. In current (known) ADN architectures, the connection between the user (e.g. a modem such as $A_1$ 112) and the Gateway Router is a Unspecified, e.g, Undefined Bit Rate (UBR), Permanent Virtual Circuit (PVC) (i.e., providing no ATM QoS). Since the ATM switch ($S_1$) 106 and DSLAM ($D_1$) 108 do not support 1P QoS, there is no way to differentiate a user's premium service traffic from best effort traffic on these network elements. (PVCs from Legacy Gateway Routers (e.g., $LR_1$ 166) are also UBR.)
3. Business ADN service is supported by a "direct" Variable Bit Rate (VBR) PVC connection to the user, which provides a higher-priority ATM CoS than UBR (and thus potentially gives this traffic precedence over the VSD traffic).

In order to provide a "work around" for these problems, the SDS 102 in accordance with the admission control method of the present invention attempts to indirectly account for the non-VSD traffic by using traffic engineering calculations as described below.

For example, for the users $A_1$ 112 and $A_3$ 116, loads on the following network links will be taken into account, in various embodiments by the SDS 102 and its admission control routine 199.

| User | ATU-R/DSLAM | DSLAM/ATM Switch | (DSLAM or ATM Switch)/GWR |
|---|---|---|---|
| $A_1$ 112 | $L(A_1, D_1)$ 140 | $L(D_1, S_1)$ 136 | $L(S_1, R_1)$ 134 |
| $A_3$ 116 | $L(A_3, D_2)$ 144 | NULL | $L(D_2, R_1)$ 138 |

For User $A_3$ 116 (the distributed variant, without the optional ATM switch), all traffic on the two links 144, 138 involved is under the control of the Gateway Router ($R_1$) 104; thus, no "work around" or "engineering traffic estimation" calculations are necessary since the traffic load can be accurately determined from the available admission information.

However, for User $A_1$ 112 (the hubbed variant, with an ATM switch ($S_1$) 106 between the DSLAM ($D_1$) 108 and Gateway Router ($R_1$) 104), the load on link $L(D_1,S_1)$ 136 may be problematic due to unaccounted loads on this link from Business ADN switch ($BS_1$) 160 and/or Legacy Gateway Router ($LR$)$_1$ 166. The total load on this link includes three factors:

$$\text{Total-Load}(L(D_1,S_1)) = \text{VSD-Load}(L(D_1,S_1)) + \text{Business ADN-Load}(L(D_1,S_1)) + \text{LegacyGWR-Load}(L(D_1,S_1)) \quad \text{(Equation 1)}$$

The values of these three factors may be computed as follows.

The VSD-Load on a link is known by the SDS 102, via summing the admitted VSD services of each of the VSD users currently active on that link, plus the observed "average" maximum utilization of Internet service for each of the provisioned subscribers (both "pure PTA (Point to Point Protocol Termination and Aggregation)" and L2TP (Layer 2 Tunneling Protocol)) on the link. An observed "high estimate" of the maximum utilization of Internet service in a current best-effort known DSL network is 20 Kbps per provisioned user. That value of 20 kbps per provisioned user may be used as the observed "average" maximum utilization of Internet service for each of the provisioned subscribers, in some embodiments of the present invention.

The maximum value of the BusinessADN-Load on a link may be determined via summing the configured Peak Cell Rates of each of the VBR PVCs provisioned on the link.

The maximum value of the LegacyGWR-Load on the link $L(D_1,S_1)$ 136 due to the Legacy Gateway Router ($LR_1$) 166 may be estimated via:

$$\text{LegacyGWR-Load}(L(D_1,S_1)) = NPVC(LR_1) \cdot \text{MaxLoadPVC}(LR_1)$$

where $NPVC(LR_1)$ is the number of PVCs provisioned on link $L(D_1,S_1)$ 136 by $LR_1$ 166, and $\text{MaxLoadPVC}(LR_1)$ is the maximum load per PVC on $LR_1$.

Note that $\text{MaxLoadPVC}(LR_1)$ is itself an estimated value. In some embodiments of the invention, the MaxLoadPVC value will be provisioned. In other embodiments, utilization of the PVCs is monitored, and the utilization information is used to increase the accuracy of the estimated MaxLoadPVC value. This monitoring may either be active (e.g., via Response Timer Response (RTR) probes) or passive (e.g., via accessing bulk performance statistics from the DSLAM ($D_1$) 108 and/or ATM switch ($S_1$) 106).

Since Equation 1 relies on maximum load estimates for the Business ADN and Legacy Gateway Router loads, the use of Equation 1 may lead to underutilization of the link $L(D_1,S_1)$ 136. Thus, it is desirable to utilize "scaling factors" to tune the load estimates based on traffic engineering estimates, as in Equation 2. (See, e.g., N. Giroux and L Ganti, *Quality of Service in ATM Networks*, Prentice Hall-PTR, 1999, pp. 90ff included herein by reference which describes the use of scale factors in load estimation)

$$\text{Total-Load}(L(D_1,S_1)) = \text{VSD-Load}(L(D_1,S_1)) + S_{BADN} \cdot \text{BusinessADN-Load}(L(D_1,S_1)) + S_{LR} \cdot \text{LegacyGWR-Load}(L(D_1,S_1)) \quad \text{(Equation 2)}$$

where $S_{BADN}$ is the Scaling factor for Business ADN load, and
$S_{LR}$ is the Scaling factor for the Legacy Gateway Router load.

Both scaling factors are real values between 0 and 1.

Figure 2:
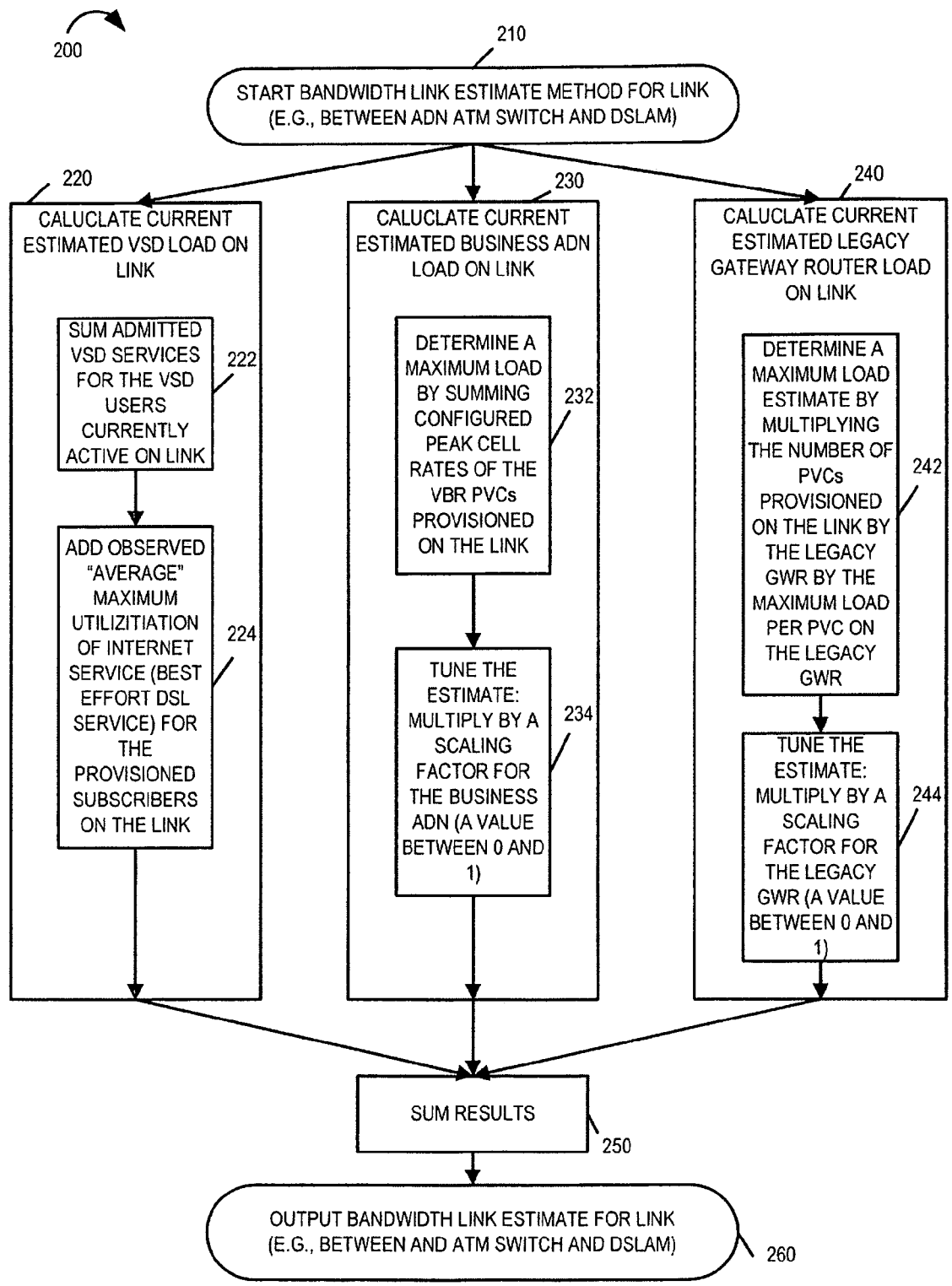
FIG. 2 illustrates an exemplary method of bandwidth estimation for communication links in accordance with the present invention.

FIG. 2 is a flowchart 200 illustrating a bandwidth usage estimation method for a link, e.g., between an ADN ATM switch and a DSLAM (e.g. link $L(D_1,S_1)$ 136 between $S_1$ 106 and $D_1$ 108) as described above, in accordance with the invention. The bandwidth link estimation method is started in step 210. In step 210, the link to be evaluated is identified; VSD users (ATU-R modems) of the link are identified; the DSLAM and ADN ATM switch connecting to the link are identified; any Business ADN ATM Switches and/or Legacy Gateway Routers connected to the ADN ATM switch are also identified. Information may also be obtained or retrieved (e.g., from a database and/or measurement probes) in step 210 regarding the elements identified, e.g., activity, service levels, max rates, utilization rates, provisioning information, estimated rates, tuning values, etc. Operation proceeds from step 210 to three steps 220, 230, and 240.

In step 220, the current estimated VSD load on the link (e.g. $L(D_1S_1)$ 136) is calculated. Step 220 includes sub-step 222 and sub-step 224. In sub-step 222, the load for the admitted VSD services (e.g., premium services) for the VSD users currently active on the link are summed. For example, user A1 112 may be active and may have been admitted to one VSD services each with a first BW allocation; user A2 114 may also be active and may have been admitted to two VSD services each with a second and third bandwidth allocation, respectively. The VSD bandwidth is summed from those three services. Operation proceeds from sub-step 222 to sub-step 224. In sub-step 224, the average maximum utilization of internet service (best effort DSL service) for the provisioned subscribers on the link (e.g., 20 Kbps/user×2 users=40 Kbps) is added to the result of step 222. The average may be for a pre-determined time period.

In step 230, the current estimated Business ADN load on the link (e.g. $L(D_1S_1)$ 136) is calculated. Step 230 includes sub-step 232 and sub-step 234. In step 232, a maximum load on the link due to the Busisness ADN ATM Switch (e.g. $BS_1$ 160) traffic is determined by summing the configured peak cell rates of the VBR PVCs provisioned on the link. Then in step 234, the current business ADN load is tuned by multiplying, the value of step 232 by a scale factor for the business ADN (e.g., a value between 0 and 1).

In step 240, the current estimated Legacy Gateway Router load on the link (e.g. $L(D_1S_1)$ 136) is calculated. Step 240 includes sub-step 242 and sub-step 244. In step 242, a maximum load on the link due to the Legacy Gateway Router (e.g. $LR_1$ 166) traffic is determined by multiplying the number of PVCs provisioned on the link by the legacy GWR by the maximum load per PVC on the legacy GWR. Then in step 244, the current legacy gateway router load estimate is tuned by multiplying, the value of step 242 by a scale factor for the legacy gateway router (e.g., a value between 0 and 1).

In step 250, the bandwidth estimates from step 220 (VSD load estimate), step 230 (Business ADN load estimate), and step 240 (Legacy GWR load estimate) are summed to obtain an overall link (e.g. $L(D_1,S_1)$ 136) estimate. In step 260, the bandwidth link estimate is output for use, e.g., by the admission control routine 199 in SDS 102.

Figure 3:
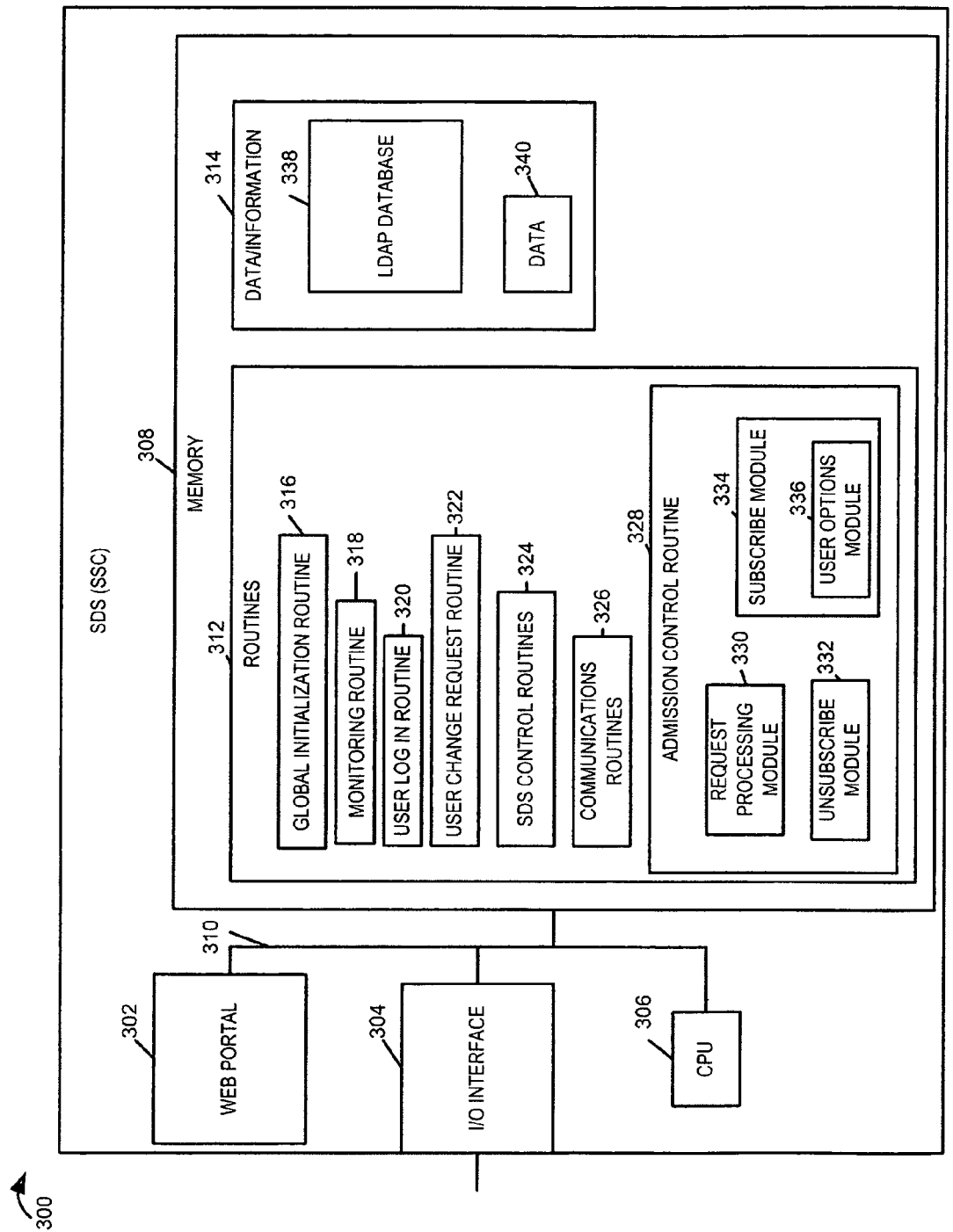
FIG. 3 illustrates a more detailed representation of an exemplary Service Deployment System (SDS) that may be used in the system of FIG. 1, implemented in accordance with the present invention.

FIG. 3 illustrates an exemplary Service Deployment System (SDS) 300, implemented in accordance with the present invention. SDS 300 may be used as SDS 102 in exemplary system 100 of FIG. 1. SDS 300 includes a Web Portal 302, an I/O interface 304, a CPU 306, and a memory 308 coupled together via a bus 310 over which the various elements may interchange data and information.

Memory 308 includes routines 312 and data/information 314. Data/information 314 includes a LDAP (Lightweight Directory Access Protocol) database 338 and data 340. LDAP (v3) is described in publicly available RFC-2251 titled: Lightweight Directory Access Protocol (v3) which can be obtained from the IETF website Routines 312 include a global initialization routine 316, a monitoring routine 318, a user log-in routine 320, a user change request routine 322, SDS control routines 324, communications routines 326, and an admission control routine 328.

Web portal 302 provides an interface to the user, e.g. ATU-R1 ($A_1$) 112, through which VSD admission control information may be conveyed between VSD users, e.g., modems such as $A_1$ 112 and SDS 300. Information regarding VSD user: log-in, log-out, requests for premium services, requests for relinquishing premium services may be conveyed via Web Portal 302. In addition SDS options for relinquishing currently active VSD premium user service(s) in order to accommodate a newly requested VSD premium service may be conveyed via Web Portal 302.

I/O interface 304 provides a network interface to a gateway router (e.g., $R_1$ 104) through which VSD user information and control information flows. VSD user information includes information about a user's current services as well service requests, e.g., information pertaining to change request made in an attempt to change VSD service levels. Control Information includes information to notify the gateway router (e.g. $R_1$ 104) of service grant decisions (admission control decisions) by the SDS 102 so that the gateway router (e.g. $R_1$ 104) can make adjustments in best effort traffic as may be required to support a service grant decision, e.g., a decision to provide a service requiring a guaranteed amount of bandwidth. I/O interface 304 also includes an interface (e.g., to a secure service provider control network) to NCON 184 and AWSs 186, 188 for information flows to obtain information used for VSD admission control. NCON 184 may provision the LDAP database 338 through interface 304 with data/information (e.g., user base rate, user phone#, user I/D, user ports). Alternately, or in addition, SDS 300 may retrieve data/information from NCON 184 and save data/information in LDAP database 338. In some embodiments, SDS 300 may also send data/information to NCON 184 through I/O interface 304. SDS 300 periodically queries the AWSs 186, 188 to receive DSLAM information, (e.g., user's sync rates).

CPU 306 executes the routines 312 and uses the data/information 314 in memory 308 to control the operation of SDS 300 including monitoring bandwidth usage and/or estimated usage on the links under SDS VSD control, processing admission control requests, making admission control decisions, and implementing admission control decisions.

Global initialization routine 316 initializes the SDS 300 when the SDS 300 is powered on. Such initialization may include starting with no VSD premium services provided and setting available bandwidth for each user link tracked by SDS 300 to a default value based on the number of users and per user internet BW. Monitoring routine 318 uses web portal 302 and monitors for input including VSD user log-ins and VSD service requests for change. Monitoring routine 318 monitors for user input. Monitoring routine 318 evokes user login routine 320 and/or user change request routine 324 in response to detected user input. User log in routine 320 identifies a VSD user, e.g., $A_1$ 112, identifies the pre-provisioned VSD premium services for that user, and evokes the admission control routine 328 for each of those pre-provisioned VSD premium services identified. User change request routine 322 identifies a user, e.g., $A_1$ 112, and identifies a request for a change in service, e.g., add a new service, drop a service, or log-out. User change request routine 322 evokes admission control routine 328 for each requested change in service. SDS control routines 324 control basic SDS 300 operation and functionality including the operation of the I/O interface 304. SDS control routines 324 also perform timing control and control the generation, transmission, and reception of message signaling to other elements in system 100, e.g., NCON

184, AWSs 186, 188, and $R_1$ 104. Communications routines 326 includes communications protocols used by SDS 300 including Lightweight Directory Access Protocol (LDAP) used for the database 338 and Structured Query Language (SQL) used for communication flows with AWSs 186, 188.

Admission control routine 328 is a more detailed representation of admission control routine 199 of FIG. 1. Admission control routine 328 controls the admission to VSD premium services for VSD users (e.g., ATU-R1 $A_1$ 112). Admission control routine 328 includes a request processing module 330, an unsubscribe module 332, and a subscribe module 334 including a user options module 336. Request processing module 330 receives a request for a change, determines the path (e.g., links including direction information) affected, and determines whether the request is a request to subscribe to a new service or an unsubscribe request from a currently subscribed service. Unsubscribe module 332 executes an unsubscribe of a service including signaling information and updating (e.g., updating available BW for each link affected, updating user current services, etc.). Subscribe module 334 determines whether a requested service can be granted, grants or denies the new service, and adjusts the available BW on each link affected (if granted). User options module 336 provides options to users, if the requested new service cannot be granted due to insufficient bandwidth. User options module 336 determines if the user may relinquish a currently subscribed service to free sufficient BW on the links to allow the new service to be granted, and offers the options available to the user.

LDAP database 338 stores information on the links, scale factors, service rates, user BW, and VSD user records. LPAD database 338 information is used by admission control routine 328 when making admission control decisions. Data 340 may include intermediate data used by the SDS in performing calculations used for admission control, e.g., bandwidth estimation calculation on links.

Figure 4:
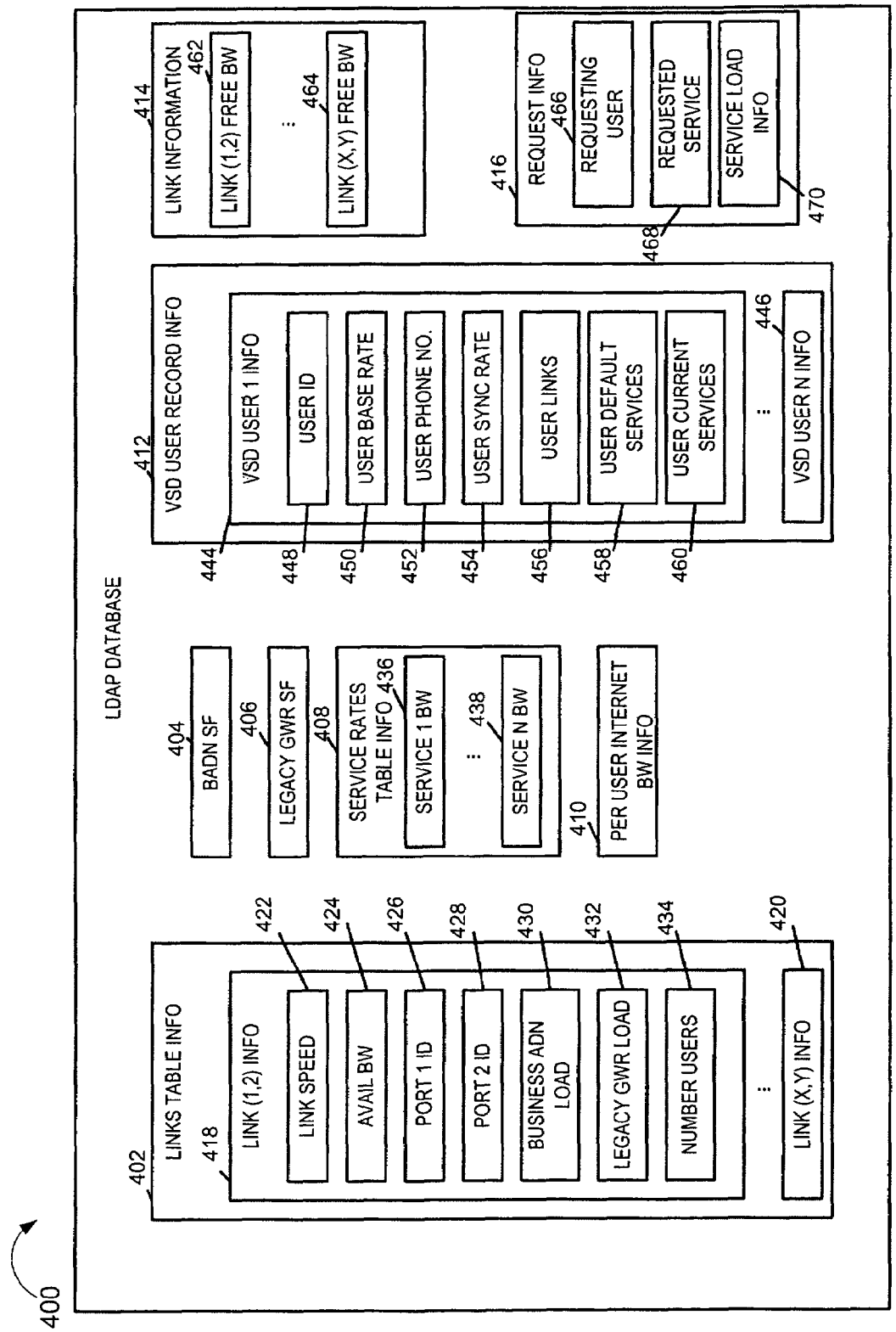
FIG. 4 illustrates a more detailed representation of an exemplary Lightweight Directory Access Protocol (LDAP) database that may be used in the Service Deployment System of FIG. 3, implemented in accordance with the present invention.

FIG. 4 illustrates a more detailed representation of an exemplary Lightweight Directory Access Protocol (LDAP) database 400 that may be used in the Service Deployment System (SDS) 300 of FIG. 3 as exemplary LDAP database 338. LDAP database 400 is implemented in accordance with the present invention. LDAP database 400 includes links table information 402, Business ADN ATM Switch Scale Factor (BADN SF) 404, Legacy Gateway Router Scale Factor (Legacy GWR SF) 406, service rates table information 408, per user Internet bandwidth information 410, VSD user record information 412, link information 414, and request information 416.

Links table information 402 is a data structure with entries for each link in the local VSD network. In exemplary system 100, links table information includes entries for links 140, 142, 136, 134, 138, 144, and 146. Link table information 402 includes a plurality of link information entries, e.g., link (1, 2) information entry 418, link (X,Y) information entry 420. The indicies for each link information entry 418, 420 identify the network elements on each end of the link. For example, consider link $L(D_1,S_1)$ 136 of FIG. 1; assume that element $D_1$ 108 is designated element #1 and element $S_1$ 106 is designated element #2, link $L(D_1,S_1)$ 136 is represented by link(1,2) information entry 418.

Exemplary link (1,2) information entry 418 includes link speed 422, available bandwidth 424, port 1 identification 426, port 2 identification 428, business ADN load 430, legacy gateway router (GWR) load 432, and number users 434. Link speed 422 is the provisioned rate of the link available for IP services. The units of link speed 422 are Kbps. Available Bandwidth (Avail BW) 424 is the bandwidth currently available on the link for new services; initially Avail BW 424 is equal to link speed 422. Port 1 ID 426 is the "originating" port on network element 1. Port 2 ID 428 is the "terminating" port on network element 2. Business ADN load 430 is the estimated bandwidth consumed on this link due to the load from business ADN switches (e.g., $BS_1$ 160). The units of business ADN load 430 are Kbps. Business ADN load 430 may be zero for some links, e,g, links 196, 144, and 146 of FIG. 1. Legacy Gateway Router (GWR) Load 432 is the estimated bandwidth consumed on this link due to load from legacy gateway routers, e.g., $LR_1$ 166. Legacy GWR load 432 may be zero for some links, e.g., links 196, 144, and 146 of FIG. 1. Number users 434 is the number of users provisioned on the link, including L2TP, PTA/L2TP, and "pure PTA" users.

Note: If there is no link between the two elements A and B, the value (load) of Link(A,B) is NULL (0). Different load scale factors are often used for different services and/or links. Accordingly, one or more individual scale factors are often stored for each link Business ADN Scale Factor (BADN SF) 404 is a scaling factor for Business ADN load estimation adjustment calculations and is between 0 and 1. Legacy GWR SF 406 Scale is a Scaling factor used for Legacy Gateway Router load estimation adjustment calculations and is between 0 and 1.

Service rates table information 408 is table of default bandwidth rates for each of a plurality VSD services available, e.g., service 1 bandwidth 436, service N bandwidth 438, in Kbps. The default bandwidth for service S is denoted by service(S) bandwidth.

Per user Internet bandwidth information 410 is an estimate of the "average" maximum Internet utilization per provisioned user. Per user Internet bandwidth information may be initially set to 20 Kbps. In some embodiments, value 410 is adjusted, e.g., periodically, based on actual and/or estimated system measured usage information.

VSD user record information 412 includes a plurality of VSD user records for each VSD user, e.g., VSD user 1 information 444, VSD user N information 446. VSD user record information 412 includes a data structure for each VSD user in the local VSD network. Each VSD user information, e.g., VSD user 1 information 444, includes a user ID 448, a user base rate 450, a user phone number 452, a user synchronization rate 454, user links 456, user default services 458, and user current services 460. User ID 448 identifies the user's PVC. User base rate 450 is a tier rate for shaping; the units of user base rate 450 are Kbps in the exemplary embodiment. User phone number 452 identifies shelf and slot of user's port in a DSLAM. User sync rate 454 (in Kbps) is the physical rate of the user's DSL line. Note that user sync rate 454 may differ from the link speed 422 of the user's DSL line in the links table information 402, since link speed 422 is defined in terms of bandwidth available at the IP layer. User links 456 is a list of the links along the user's data path from the ATU-R to the Gateway Router. In some embodiments, user links 456 may include pointers to structures in the links table information 402. User default services 458 is a list of the user's default (pre-provisioned) services. Each element in the list is a value indicating the service and the bandwidth required by the service. User current services 460 is a list of the user's currently subscribed services. Initially user current services 460 is the same as user default services 458, but user current services is updated as the user subscribes/unsubscribes to new services.

Link information 414 includes a plurality of local variables, e.g., link (1,2) free bandwidth 462, link (X,Y) free bandwidth 464. Each value, e.g., link (1,2) free bandwidth is the computed free bandwidth currently available on a link.

When processing a user request for a new service, the admission control routine 328 may determine which links are affected, calculate the free bandwidth for each link affected, and compare the free bandwidth for each link to the new (requested) service bandwidth rate to make admission decisions.

Request information 416 includes requesting user 466, requested service 468, and service load information 470. Requested information 416 may be input through web portal 302. Requested information 416 may be passed to the admission control routine 328, when the admission control routine 328 is evoked. Requesting user 466 is the index of the requesting user's VSD user record information 412. Requested service 468 is the type of service being requested. Service load information 470 is the bandwidth required by the requested service 468 in Kbps. If the invoking procedure does not know the actual bandwidth required, it may invoke the admission control routine 328 with the default bandwidth for requested service 468 from the service rates table information 408. If service load information 470 is less than or equal to zero, requested service 468 is to be unsubscribed for the user.

Figure 5:
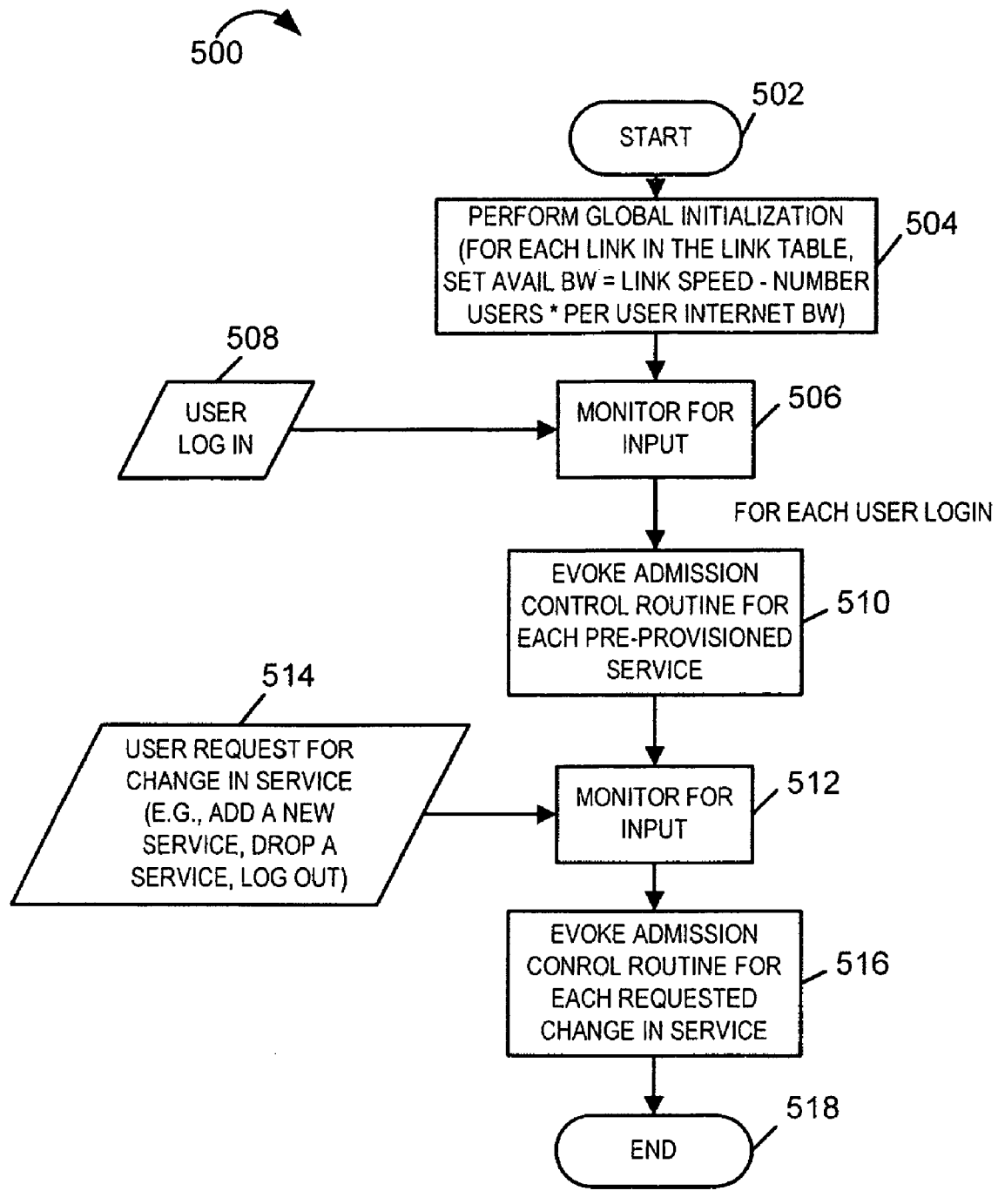
FIG. 5 shows a flowchart illustrating an exemplary method of controlling the user access and bandwidth allocation in DSL service, in accordance with the present invention.

FIG. 5 is a flowchart 500 illustrating an exemplary method to control the user access and bandwidth allocation in DSL service in accordance with the present invention. In step 502, the method is started, e.g., when system 100 is powered on and/or reinitialized. Operation proceeds to step 504 in which global initialization is performed. In step 504, the LDAP database 400 is established; NCON 184 provisions the LDAP database 400 with information including VSD user record information 412, BADN SF 404, legacy GWR SF 406, Service Rates Table information 408, per user Internet BW information 410, and links table information 418. For each link in the links table information 402 initial available BW is set, e.g., for link(1,2) info 418 available BW 424 is set equal to link speed 422−(number users 434)*(per user internet BW 410). In step 504 the estimated bandwidth usage over the links in the VSD controlled network has been established for regular user Internet service; the VSD users have not yet been admitted to premium VSD services.

Operation proceeds to step 504. In step 504, monitoring routine 318 monitors for input, e.g., user log in information 508. The input may be received through web portal 302. When the monitoring routine 318 detects a user log in 508, the monitoring routine 318 evokes the user log-in routine 320.

Operation proceeds to step 510. In step 510, user log in routine 320 identifies the user, accesses the VSD user record information 412, e.g., VSD user 1 information 444 including the user default services 458. For each pre-provisioned service listed in user default services 458, the user log-in routine evokes the admission control routine 328 and requests admission to a service. The admission control routine 328 processes the request and grants or denies service for the request in accordance with the methods of the invention. Now, the VSD logged-in user has been admitted to the pre-selected premium VSD services, where possible, and the estimated bandwidth over the links in the VSD controlled network has accounted for the admission of those premium services.

In step 512, monitoring routine 512 continues to monitor for user input, e.g., a user request for a change in service 514. A user request for a change in service 514 may include a request to add a new service, a request to drop a service, or a request to log-out, e.g., a request to drop each of the currently subscribed VSD premium services. In some embodiments multiple user requests 514 may be input simultaneously. When monitoring routine 318 detects a user request for change in service 514, it evokes the user change request routine 322, which processes the request. The user change request routine 322 stores the user request information 514 in LDAP database request information 416. In step 516, the user change request routine 322 evokes the admission control routine 328 for each requested change in service. The admission control routine 328 processes the request and grants or denies service for the request in accordance with the methods of the invention.

The method of controlling user access and bandwidth allocation ends in step 518. However, monitoring continues in step 506 for additional user log-ins 508 and in step 512 for additional user requests for change in service 514.

Figure 6A:
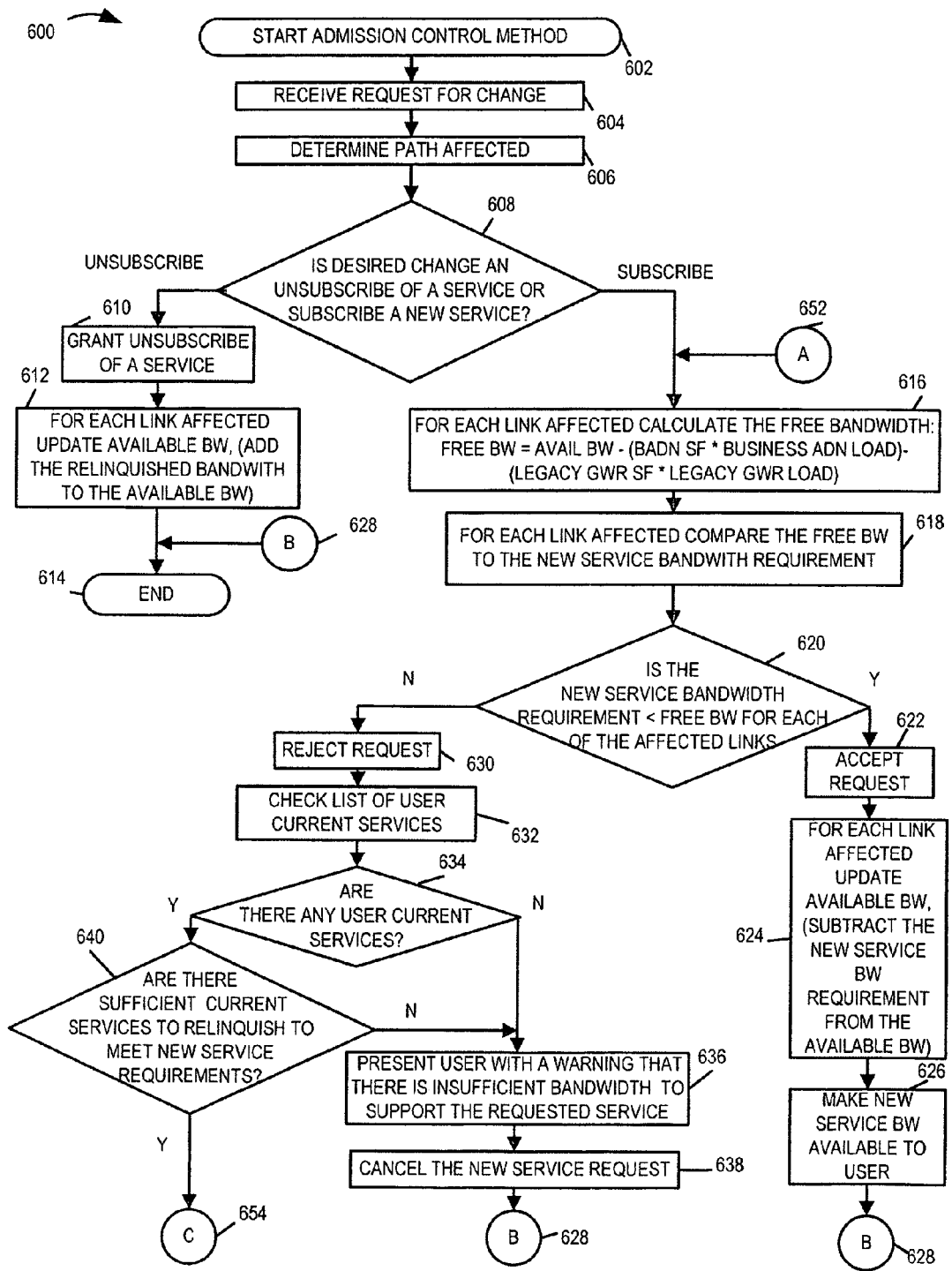
FIG. 6 shows a flowchart illustrating a method of an exemplary admission control method, in accordance with the present invention.

FIG. 6 is a flowchart 600 illustrating an exemplary method of admission control that may be used by admission control routine 328 in accordance with the invention. The admission control method starts in step 602, e.g., where the admission control routine 328 is evoked by the user log-in routine 320 or the user change request routine 322. Next, in step 604, the request processing module 330 receives a request for change including request information 416. Operation proceeds to step 606, where request processing module 606 determines the path affected, and sets up link information entries 414 for each of the links along the affected path. Then, in step 608, the request processing module 330 determines if the desired change is an unsubscribe to a service or a subscribe to a new service. If the request is an unsubscribe of a service, operation proceeds to step 610 and control is transferred to the unsubscribe module 332. If the request is a subscribe of a new service, operation proceeds to step 616 and control is transferred to subscribe module 334.

Assume for discussion purposes operation proceeds from step 608 to step 610. In step 610, unsubscribe module 332 grants the user an unsubscribe of a premium VSD service. The unsubscribe grant may be forwarded to the user via Web portal 302. Also the unsubscribe grant is forwarded to gateway router $R_1$ 104. In addition, the unsubscribed service may be removed from the user current services 460 entry in the user's VSD record (e.g., VSD user 1 info 444). In this manner the various devices are made aware that resources are being freed on the affected link. Operation proceeds from step 610 to step 612. In step 612, unsubscribe module 332, for each link affected, updates the available bandwidth 424 by adding the relinquished bandwidth (corresponding to the unsubscribed service) to the available bandwidth 424. Operation of the admission control routine 328 terminates in step 614.

Assume operation proceeds from step 608 to step 616. In step 616 subscribe module 334 calculates the free bandwidth for each of the links that are affected if the new service is granted. For example, consider that link (1,2) was one of the links affected; Link (1,2) free BW 462=avail BW 424−(BADN SF 404\*Business ADN Load 430)−(Legacy GWR SF 406\*Legacy GWR Load 432). Next, in step 618, for each link affected, the free BW (calculated in step 616) is compared to the new service request bandwidth requirement. The new service request bandwidth requirement may be included in the service load information 470 or may be obtained from the service rates table information 408 based on the requested service specified in requested service 468. For example, link (1,2) free BW 462 may be compared to service load information 470; alternately free BW 462 may be compared to a service rate, e.g., service N BW 438 assuming the requested service is service N.

In step 620 a check is performed as to whether the new service bandwidth requirement is less than the free bandwidth for each of the affected links. If the new service requirement is less than the free bandwidth for each of the affected links, sufficient resources exist to admit the new service; therefore, operation proceeds to step 622 where the request is accepted.

Operation proceeds from step 622 to step 624, where for each link affected, the available bandwidth, e.g., avail BW 424, in the links table info 402 is updated by subtracting the new service BW from the available bandwidth. In addition, the user current services, e.g., user current services 460, is updated for the requesting VSD user. In step 626, the new service is made available to the user. The SDS 102 notifies the gateway router $R_1$ 104 of the admission control decision. In step 626, the SDS 102 also notifies the user, e.g., ATU-R1 $A_1$ 112 that the new premium VSD service requested has been granted and is now available. From step 626 operation proceeds via connecting node B 628 to end node 614.

However, if the check in step 620 revealed that there is insufficient free BW on each of the links affected to support the new service, operation proceeds to step 630. In step 630 the request is rejected. Operation proceeds from step 630 to step 632. In step 632, a check is made of the user current services, e.g., access user current services information 460 if the user is VSD user 1. In step 634, subscribe module 334 determines whether the user requesting the new service has any current (premium) VSD services active. If there are no current services, operation proceeds to step 636. In step 636, the user is presented via web portal 302, with a warning that there is insufficient bandwidth to support the requested service. Next, in step 638, subscribe module 334 cancels the new service request. Operation proceeds from step 638 to end node 614 via connecting node B 628.

In step 634, if it was determined that some user services exist for the requesting user, operation proceeds to step 640. In step 640, a check is performed to determine whether the requesting user has sufficient current services, which if relinquished, could meet the new service bandwidth requirements on the affected links. If there are insufficient current resources, operation proceeds to step 636. However, if there are sufficient current resources, operation proceeds from step 640 to step 642 (via connecting node C 654). In step 642, user options module 336 presents the user, via Web portal 302, with a list of the user current services and gives the user a choice of dropping a current service or canceling the new service request. In some embodiments, user option 336 module may present the user with bandwidth information for each service. In some embodiments, user options module 336 may present the user with the option of dropping multiple services. In some embodiments, user options module 336 may present the user with alternative scenarios that may be selected to obtain the bandwidth needed by the new requested service. The response from the user, via Web portal 302, is received in step 643 and evaluated in step 644 by user options module 336. If the user did not select to drop a current service, then operation proceeds to step 646, where the new service request is canceled. Operation proceeds from step 646 to end node 614 via connecting node B 628. However, if the user did select to drop a current service in step 644, operation proceeds to step 648. In step 648, unsubscribe module 332 grants the user an unsubscribe of a premium VSD service. The unsubscribe grant may be forwarded to the user via Web portal 302. Also the unsubscribe grant may be forwarded to gateway router $R_1$ 104, so that $R_1$ 104. In addition, the unsubscribed service will be removed from the user current services 460 entry in the user's VSD record (e.g., VSD user 1 info 444). Operation proceeds from step 648 to step 650. In step 650, unsubscribe module 332, for each link affected, updates the available bandwidth 424 by adding the relinquished bandwidth (corresponding to the unsubscribed service) to the available bandwidth 424. Operation proceeds from step 650 to step 616 via connecting node A 652. Additional BW on the links of the VSD network has been freed by the relinquished service(s).

In step 620, the new values for free bandwidth are calculated. Operation proceeds from step 616 to step 618 as previously described.

Various components, modules, software, databases, etc. in the exemplary DSL VSD system have been described in the application with respect to specific manufactures and trade names, such as, e.g., Alcatel modems/switches/test devices, etc.; however, the present invention is applicable to other DSL systems, e.g., systems using similar or alternative components, modules, software, databases, etc. In addition the various functions of the invention may be implemented using modules. Such modules may use hardware, software, and/or a combination of hardware software in accordance with the invention.

What is claimed is:

1. A centralized method of providing admission control functionality in a communications system including a plurality of nodes, said plurality of nodes including a control node, at least a first node coupled to a second node by a first link, a third node coupled to the second node by a second link and a fourth node coupled to the third node by a third link, the control node coupled to at least one of said first, second, third, and further nodes, the method comprising:

maintaining a set of link bandwidth utilization information, the set of link bandwidth utilization information including bandwidth utilization statistics for at least each of the first, second and third nodes;

operating the control node to receive a service request corresponding to the first node and to determine from said maintained set of link bandwidth utilization information if there is sufficient bandwidth available on at least said second and third links to satisfy said service request; and operating the control node to generate the link bandwidth utilization information corresponding to said second link from an estimate of bandwidth that will be used on said second link by services over which said control node does not have admission control and a sum of services which will use said second link which said control node authorized, said services over which said control node does not have admission control including at least one service that uses a business switch or gateway router to pass traffic over said second link.

2. The method of claim 1, wherein said link bandwidth utilization information corresponding to said second link is further generated as a function of a link utilization scaling factor.

3. The method of claim 2, wherein best effort Internet traffic is carried over said second link and where said link bandwidth utilization information corresponding to said second link is further generated as a function of the physical link capacity of links used to couple Internet service users to said second link and an average of the physical link capacity which is used over a period of time by said users for Internet service.

4. The method of claim 3, wherein said control node generates a control message to reduce the amount of bandwidth allocated to best effort traffic on one of said first, second and third links, when a service request for a service requiring a guaranteed amount of bandwidth on said one of said first, second and third links is received and said guaranteed amount of bandwidth is not available due to best effort traffic on said one of said first, second and third links.

5. A centralized method of providing admission control functionality in a communications system including a plurality of nodes, said plurality of nodes including a control node, at least a first node coupled to a second node by a first link, a third node coupled to the second node by a second link and a fourth node coupled to the third node by a third link, the control node coupled to at least one of said first, second, third, and further nodes, the method comprising:

maintaining a set of link bandwidth utilization information, the set of link bandwidth utilization information including bandwidth utilization statistics for at least each of the first, second and third nodes;

operating the control node to receive a service request corresponding to the first node and to determine from said maintained set of link bandwidth utilization information if there is sufficient bandwidth available on at least said second and third links to satisfy said service request;

when it is determined from said maintained set of link bandwidth utilization information that there is insufficient bandwidth available to satisfy said service request, determining if a user to whom said service request corresponds is using other services which could be terminated to provide the bandwidth required to satisfy said service request;

when it is determined that said user to whom said service request corresponds is using other services which could be terminated to provide the bandwidth required to satisfy said service request, presenting the user with the option of terminating the services being provided to said user which could be used to provide the bandwidth required to satisfy the service request;

operating the control node to receive a reply from said user indicating a desire to terminate services or not to terminate services;

denying said service request when said reply indicates a desire not to terminate services; and granting said service request when said reply indicates a desire to terminate services.

6. The method of claim 5, where said step of granting said service request includes:

operating the control node to terminate at least some services provided to said user and to reallocate at least some of the bandwidth used by said services to providing the requested service.

7. The method of claim 5, wherein presenting the user with the operation of terminating the services includes:

providing information to said user through a web interface indicating which services are available for termination.

8. A communications system comprising:

a first node;

a second node coupled to the first node by a first link;

a third node coupled to the second node by a second link;

a fourth node coupled to the third node by a third link; and a control node coupled to at least one of said first, second, third, and further nodes, said control node including and maintaining a set of link bandwidth utilization information, the set of link bandwidth utilization information including bandwidth utilization statistics for at least each of the first, second and third nodes; said control node further including:

means for receiving a service request corresponding to the first node and to determine from said maintained set of link bandwidth utilization information if there is sufficient bandwidth available on at least said second and third links to satisfy said service request, and wherein said control node further comprises:

means for generating link bandwidth utilization information corresponding to said second link from an estimate of bandwidth that will be used on said second link by services over which said control node does not have admission control and a sum of services which will use said second link which said control node authorized, said services over which said control node does not have admission control including at least one service that uses a business switch or gateway router to pass traffic over said second link.

9. The system of claim 8, wherein said link bandwidth utilization information corresponding to said second link is further generated as a function of a link utilization scaling factor.

10. The system of claim 9, wherein best effort Internet traffic is carried over said second link and where said link bandwidth utilization information corresponding to said second link is further generated as a function of the physical link capacity of links used to couple Internet service users to said second link and an average of the physical link capacity which is used over a period of time by said users for Internet service.

* * * * *